US012620193B2

(12) United States Patent (10) Patent No.: US 12,620,193 B2
Yang (45) Date of Patent: May 5, 2026

(54) COMPUTER-READABLE RECORDING MEDIUM STORING IMAGE PROCESSING PROGRAM, IMAGE PROCESSING APPARATUS, AND IMAGE PROCESSING METHOD

(71) Applicant: FUJITSU LIMITED, Kawasaki (JP)

(72) Inventor: Fan Yang, Edogawa (JP)

(73) Assignee: Fujitsu Limited, Kawasaki (JP)

( * ) Notice: Subject to any disclaimer, the term of this patent is extended or adjusted under 35 U.S.C. 154(b) by 293 days.

(21) Appl. No.: 18/606,902

(22) Filed: Mar. 15, 2024

(65) Prior Publication Data

US 2024/0273854 A1 Aug. 15, 2024

Related U.S. Application Data

(63) Continuation of application No. PCT/JP2021/035727, filed on Sep. 28, 2021.

(51) Int. Cl.
*G06V 10/25* (2022.01)
*G06T 7/20* (2017.01)
(Continued)

(52) U.S. Cl.
CPC ................ *G06V 10/25* (2022.01); *G06T 7/20* (2013.01); *G06T 7/50* (2017.01); *G06T 7/62* (2017.01);
(Continued)

(58) Field of Classification Search
CPC .... G06V 10/25; G06V 2201/07; G06V 40/23; G06V 20/42; G06T 7/00; G06T 7/20;
(Continued)

(56) References Cited

U.S. PATENT DOCUMENTS 6,678,413 B1 1/2004 Liang et al.
2019/0287212 A1 9/2019 Yanagisawa
(Continued)

FOREIGN PATENT DOCUMENTS

JP 2004287806 A * 10/2004
JP 2005-135014 5/2005
(Continued)

OTHER PUBLICATIONS

Masui et al., "Practical application of gymnastic grading support system by 3D sensing and technique recognition technology", Journal of Information Technology Society of Japan, "Digital Practice Corner", vol. 1, No. 1, Oct. 2020 Full Machine Translation.
(Continued)

*Primary Examiner* — Carol W Chan
(74) *Attorney, Agent, or Firm* — Fujitsu Intellectual Property Center

(57) ABSTRACT

A method for automatically inferring a 2D scale range threshold to eliminate 2D object bounding boxes outside the target non-planar zone in a corresponding monocular image. The method leverages given camera parameters, 3D coordinates of the target non-planar zone vertices, and the real 3D scale of the target object. The process comprises three primary steps: 1) Deriving the real 3D object scale range from pre-acquired data, 2) Estimating the corresponding 2D bounding box scale range in the image using camera parameters, 3D coordinates of the target non-planar zone, and the real 3D scale range obtained in the first step, 3) Eliminating bounding boxes that fall outside the bounding box scale range.

15 Claims, 19 Drawing Sheets

(51) Int. Cl.
| | |
|---|---|
| *G06T 7/50* | (2017.01) |
| *G06T 7/62* | (2017.01) |
| *G06T 7/70* | (2017.01) |

(52) U.S. Cl.
CPC ...... *G06T 7/70* (2017.01); *G06T 2207/30196* (2013.01); *G06V 2201/07* (2022.01)

(58) Field of Classification Search
CPC .... G06T 7/50; G06T 7/62; G06T 7/70; G06T 2207/30196
See application file for complete search history.

(56) References Cited

U.S. PATENT DOCUMENTS

| | | | |
|---|---|---|---|
| 2020/0037972 A1* | 2/2020 | Imagawa ............... | A61B 6/487 |
| 2021/0150220 A1 | 5/2021 | Ueda et al. | |
| 2021/0168394 A1 | 6/2021 | Kato et al. | |

FOREIGN PATENT DOCUMENTS

| | | |
|---|---|---|
| JP | 2010-045501 | 2/2010 |
| JP | 2011-209794 | 10/2011 |
| JP | 2019-159739 | 9/2019 |
| JP | 2020-160812 | 10/2020 |
| WO | 2020/017359 | 1/2020 |

OTHER PUBLICATIONS

Tang et al., "MOANA: An Online Learned Adaptive Appearance Model for Robust Multiple Object Tracking in 3D", IEEE Access, vol. 7, 2019, pp. 31934-31945.
Citraro et al.,"Real-Time Camera Pose Estimation for Sports Fields", arXiv.org, arXiv: 2003.14109v1, Mar. 2020, 12 pages.
Homayounfar et al., "Sports Field Localization via Deep Structured Models", 2017 IEEE Conference on Computer Vision and Pattern Recognition (CVPR), Jul. 2017, pp. 4012-4020.
Yang et al., "Using Panoramic Videos for Multi-Person Localization and Tracking in a 3D Panoramic Coordinate", arXiv.org, arXiv: 1911.10535v5, Mar. 2020, 5 pages.
WIPO, International Search Report with English-language translation and Written Opinion mailed Dec. 14, 2021, in connection with PCT/JP2021/035727.
EESR—Extended European Search Report dated Oct. 22, 2024 from corresponding European Patent Application No. 21959277.1 [11 pages]. ** JP2020-160812 cited in the EESR was previously submitted in the IDS filed on Mar. 15, 2024.

* cited by examiner

START

1601 — EXTRACT IMAGE

1602 — GENERATE REGION INFORMATION

1603 — GENERATE TARGET OBJECT INFORMATION

1604 — GENERATE RANGE INFORMATION

1605 — GENERATE TARGET OBJECT REGION INFORMATION

1606 — SKELETON RECOGNITION PROCESS

1607 — OUTPUT

END

1

COMPUTER-READABLE RECORDING MEDIUM STORING IMAGE PROCESSING PROGRAM, IMAGE PROCESSING APPARATUS, AND IMAGE PROCESSING METHOD

CROSS-REFERENCE TO RELATED APPLICATION

This application is a continuation application of International Application PCT/JP2021/035727 filed on Sep. 28, 2021 and designated the U.S., the entire contents of which are incorporated herein by reference.

FIELD

The present disclosure relates to an image processing technique.

BACKGROUND

In relation to an image process, a technique is known in which a region surrounding an object such as a person in an image is extracted from the image captured by a camera. The region surrounding the object may be referred to as a bounding box.

Related art is disclosed in Japanese Laid-Open Patent Publication No. 2010-45501, Japanese Laid-Open Patent Publication No. 2011-209794 and U.S. Pat. No. 6,678,413.

Related art is disclosed in Shoichi Masui et al., "Practical application of gymnastic grading support system by 3D sensing and technique recognition technology", Journal of Information Technology Society of Japan, "Digital Practice Corner", Vol. 1, No. 1, October 2020, Z. Tang et al., "MOANA: An Online Learned Adaptive Appearance Model for Robust Multiple Object Tracking in 3D", IEEE Access, Vol. 7, 2019, pages 31934-31945, L. Citraro et al., "Real-Time Camera Pose Estimation for Sports Fields", arXiv. org, arXiv:2003. 14109v1, March 2020, 12 pages, N. Homayounfar et al., "Sports Field Localization via Deep Structured Models", 2017 IEEE Conference on Computer Vision and Pattern Recognition (CVPR), July 2017, pages 4012-4020, and F. Yang et al., "Using Panoramic Videos for Multiperson Localization and Tracking in a 3D Panoramic Coordinate", arXiv. org, arXiv:1911.10535v5, March 2020, 5 pages.

SUMMARY

According to an aspect of the embodiments, a nontransitory computer-readable recording medium stores an image processing program causing a computer to execute processes of: deriving the real 3D object scale range from pre-acquired data; estimating the corresponding 2D bounding box scale range in the image using camera parameters, 3D coordinates of the target non-planar zone, and the real 3D scale range obtained in the first step; eliminating bounding boxes that fall outside the bounding box scale range.

The object and advantages of the invention will be realized and attained by means of the elements and combinations particularly pointed out in the claims.

It is to be understood that both the foregoing general description and the following detailed description are exemplary and explanatory and are not restrictive of the invention.

2

Figure 2:
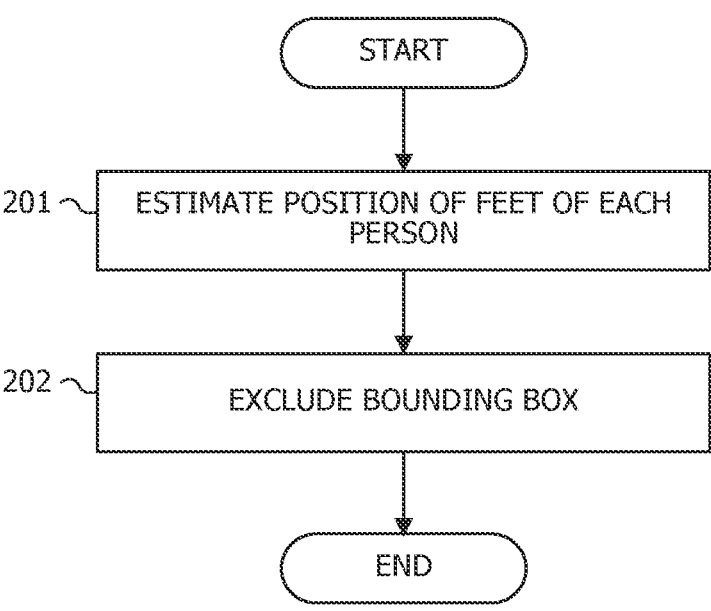
Figure 3:
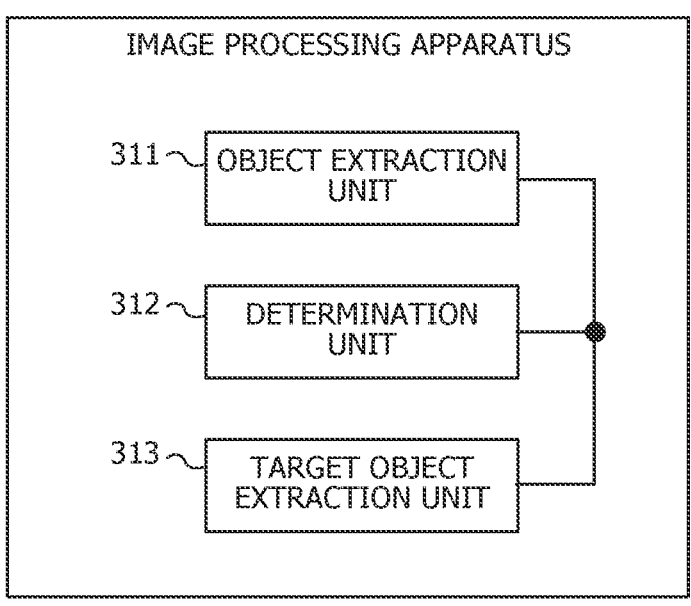
Figure 4:
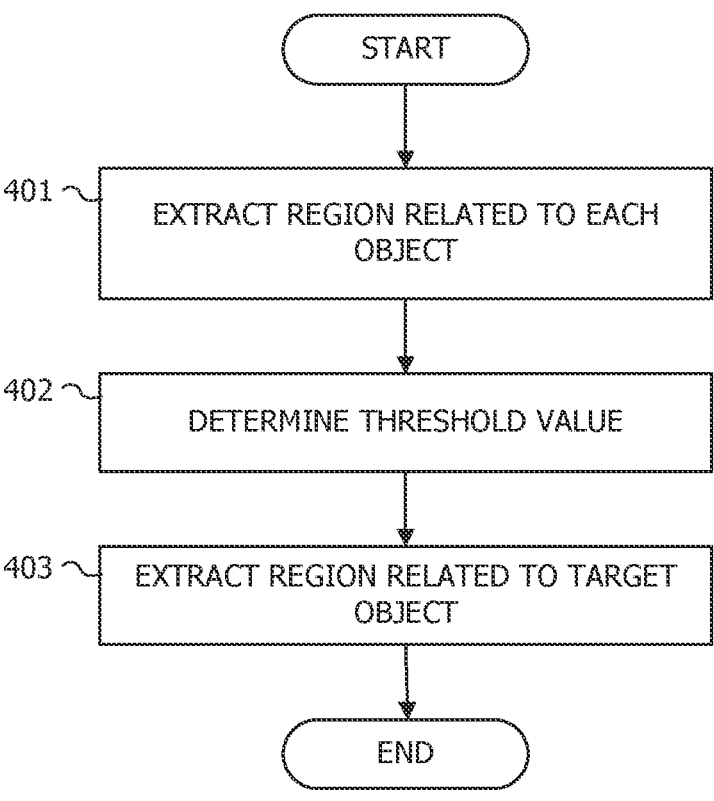
Figure 5:
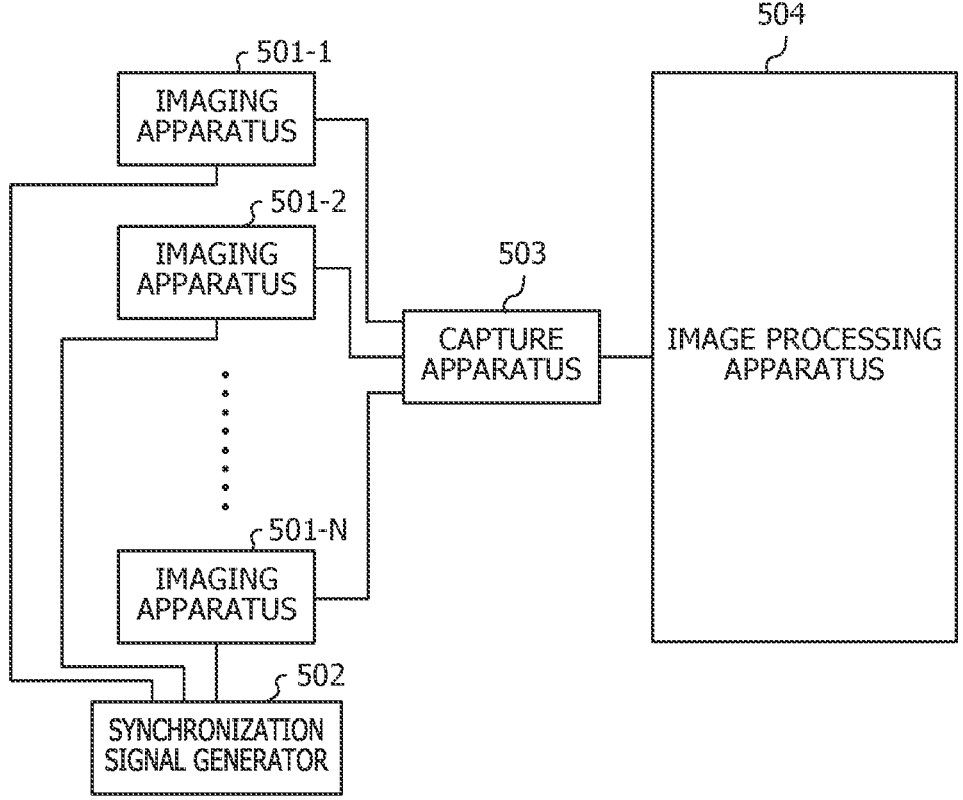
Figure 6:
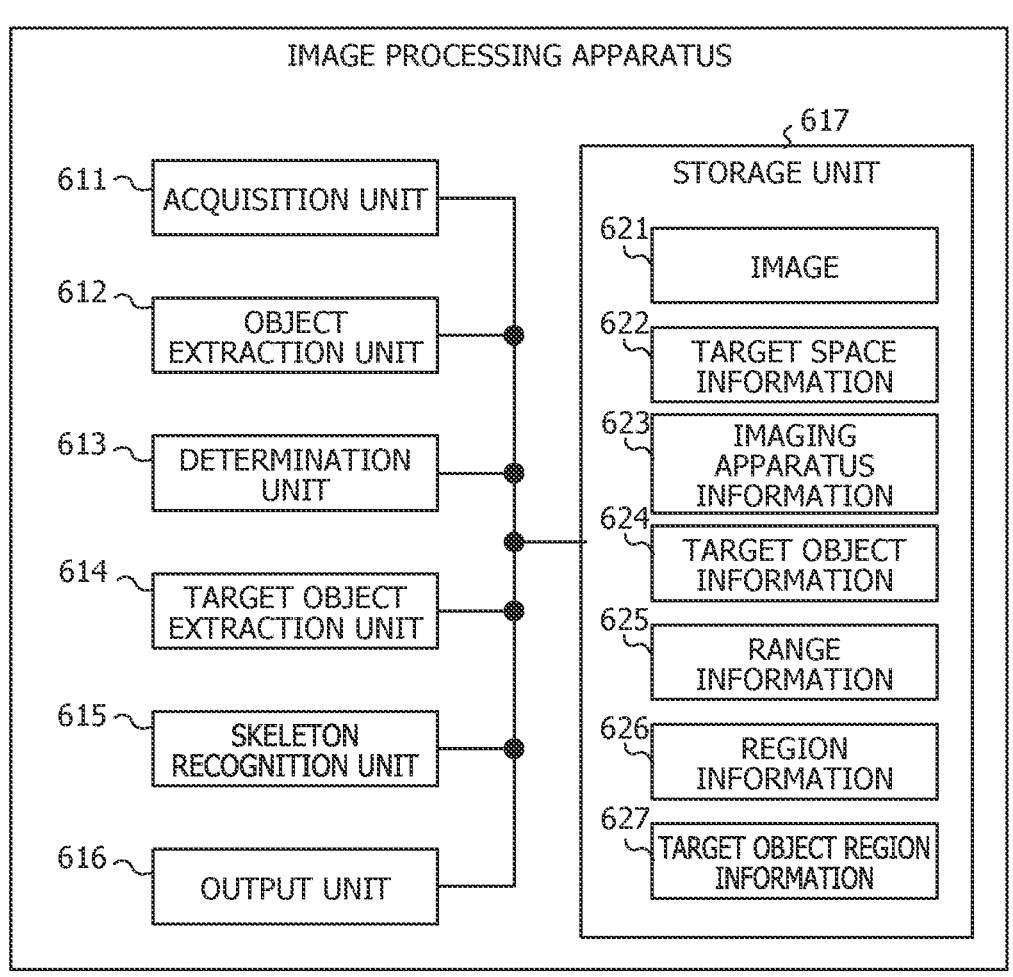
Figure 7C:
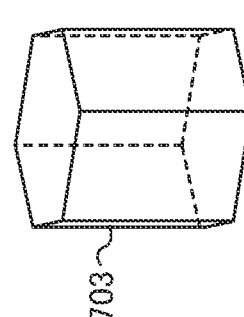
Figure 7B:
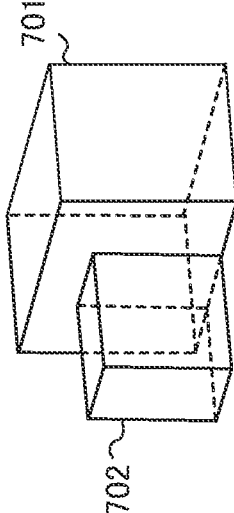
Figure 7A:
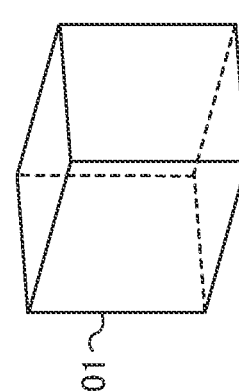
Figure 8:
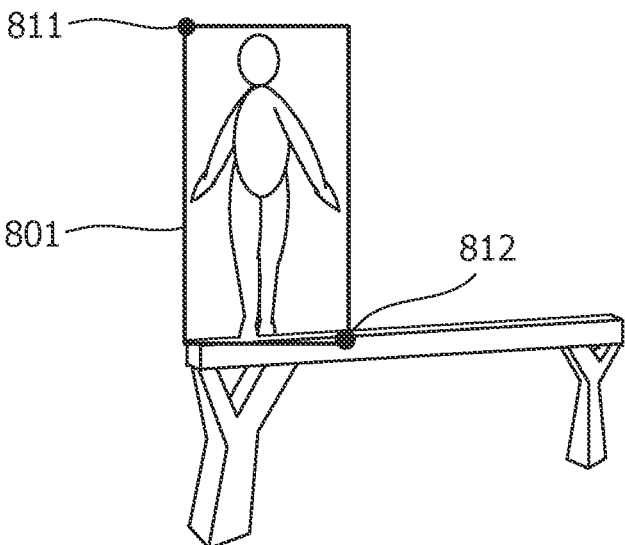
Figure 9B:
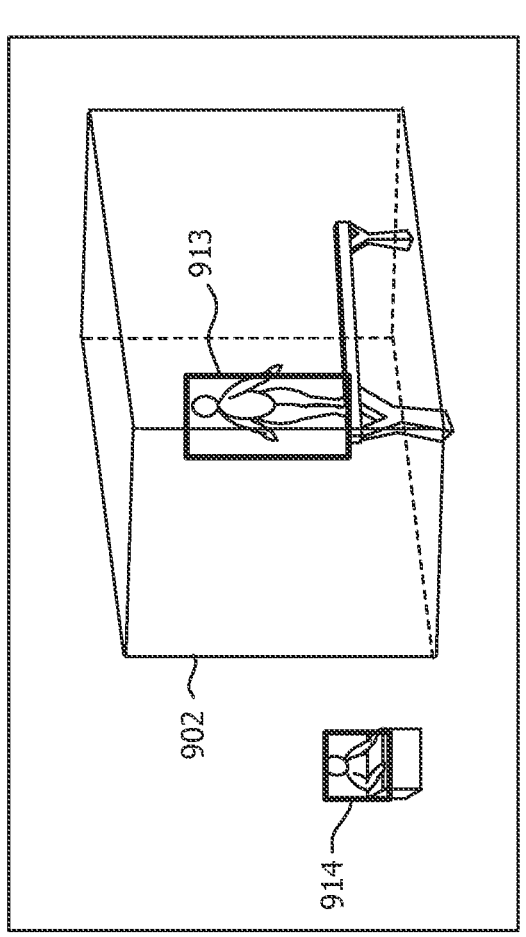
Figure 9A:
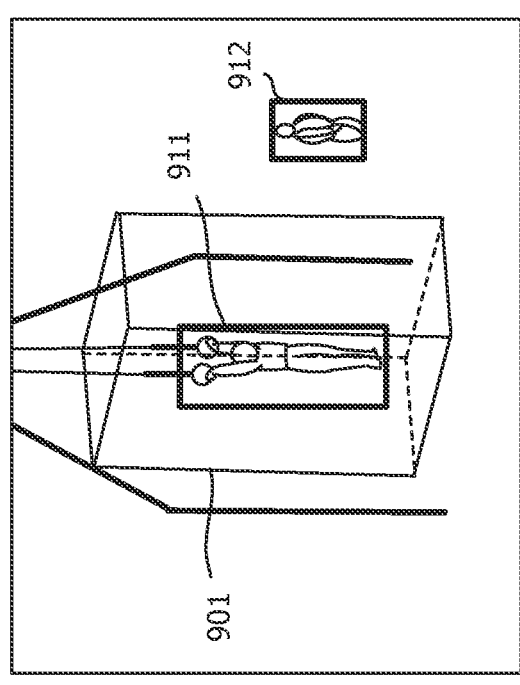
Figures 10A, 10B, 10C, 10D, 10E:
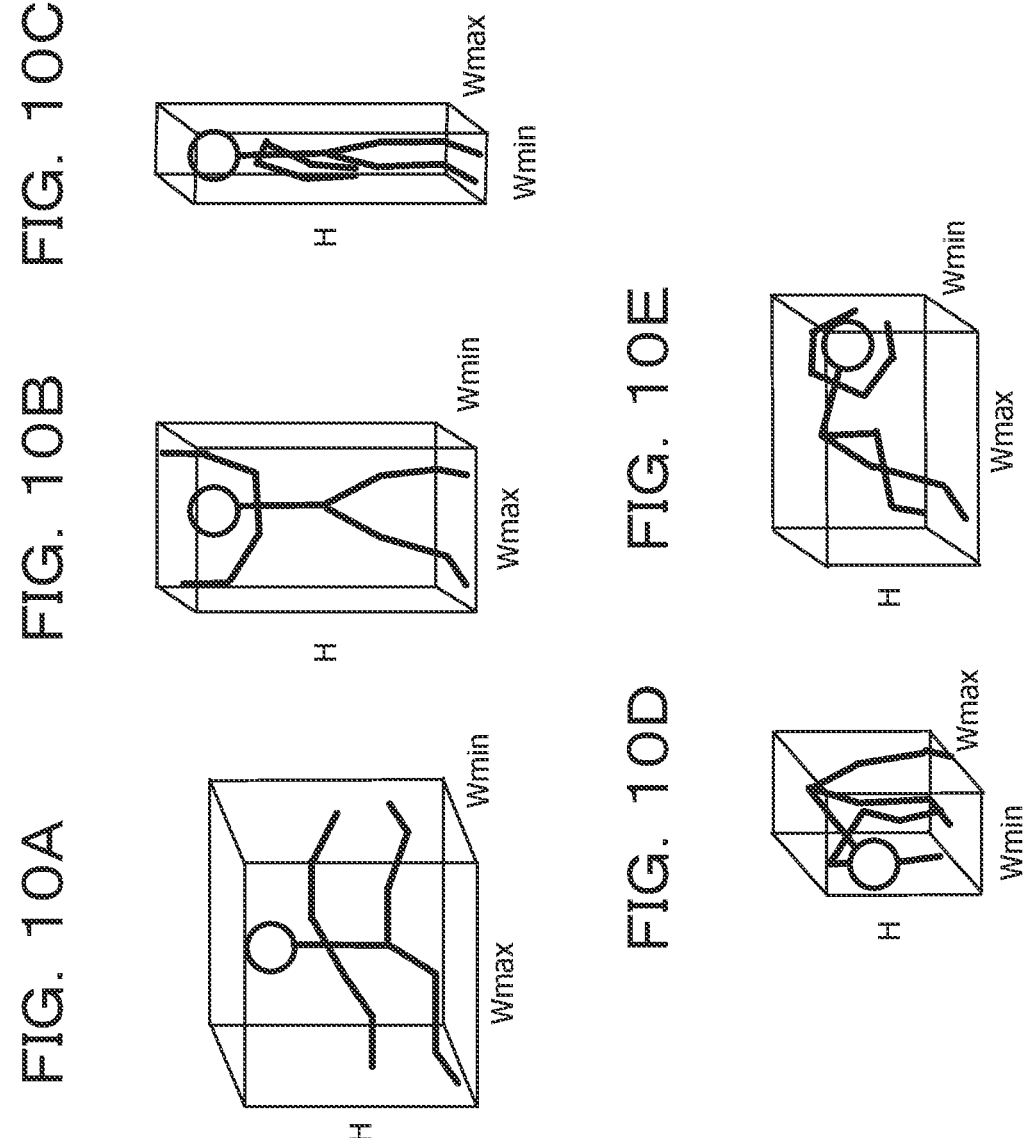
Figure 11B:
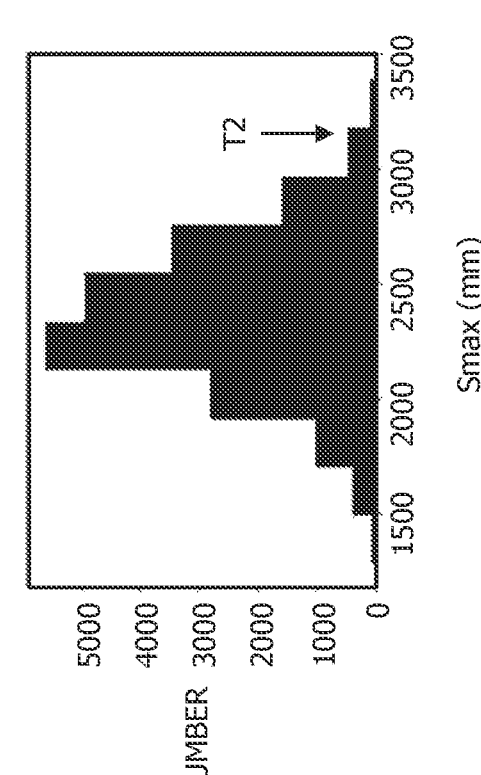
Figure 11A:
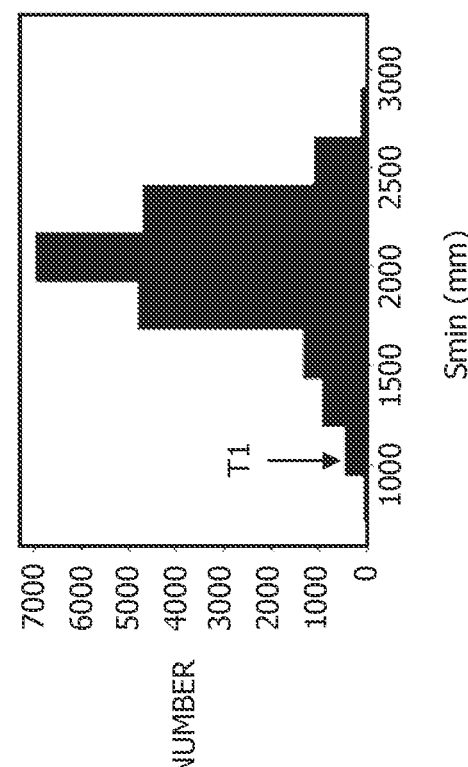
Figure 13B:
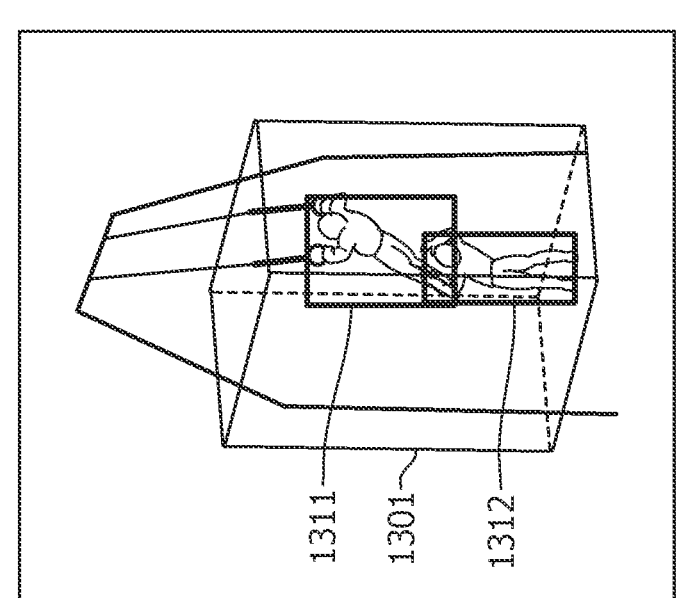
Figure 13A:
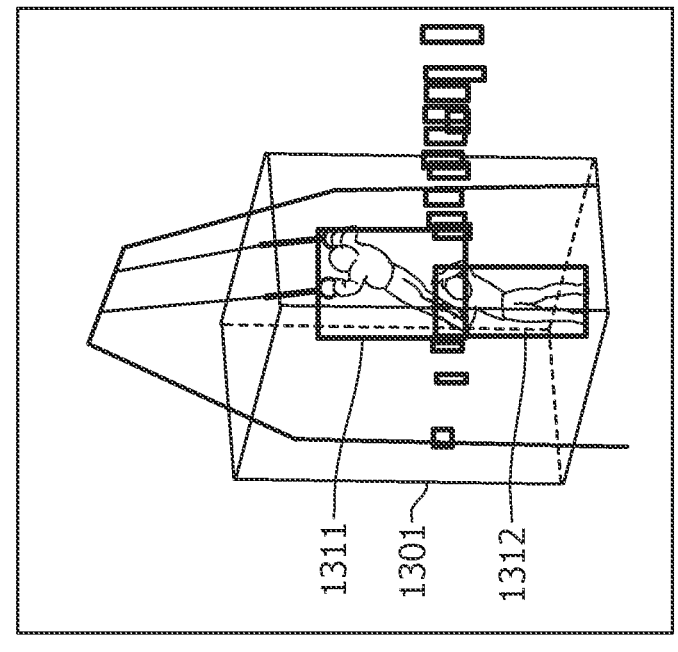
Figure 16:
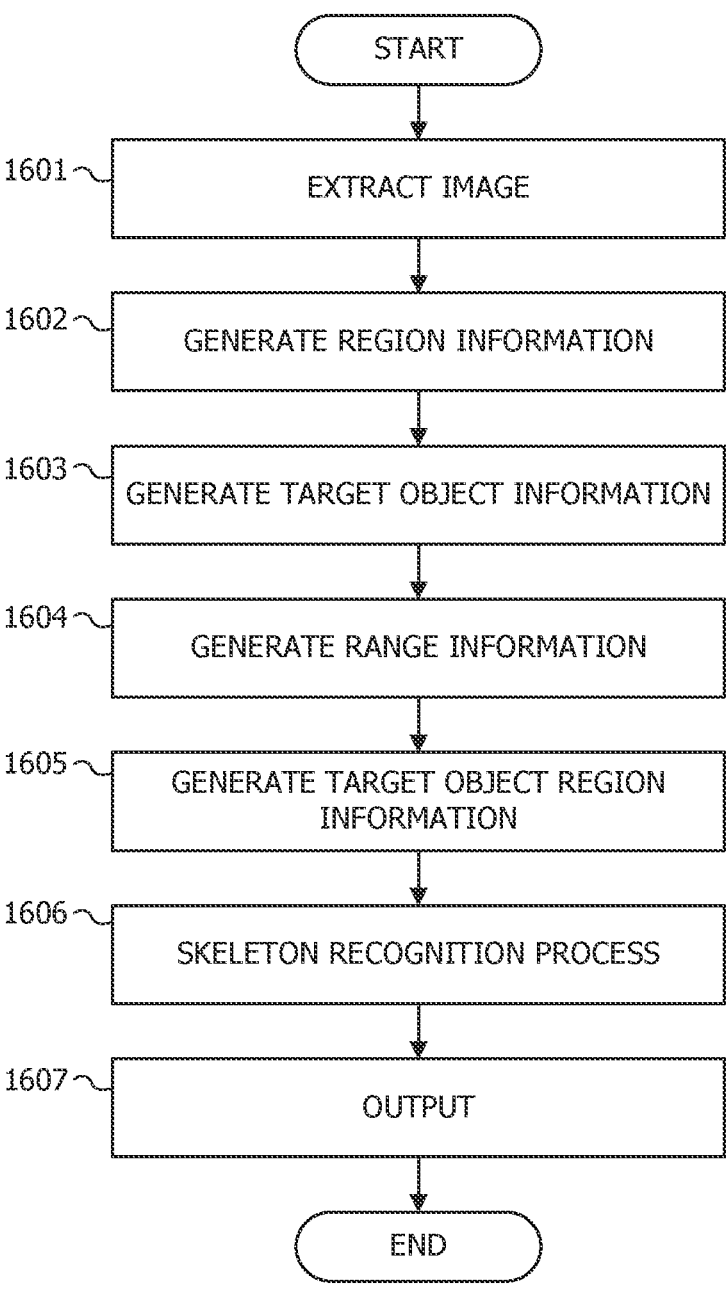
Figure 17B:
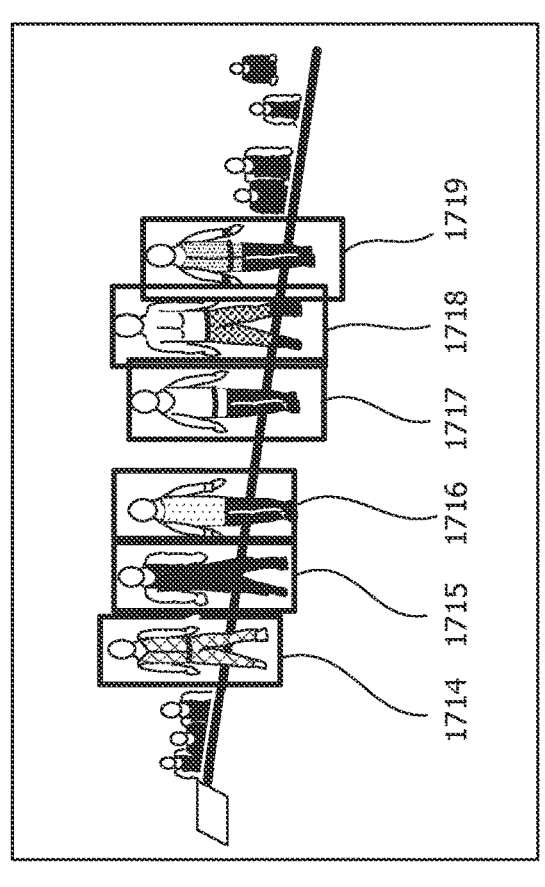
Figure 17A:
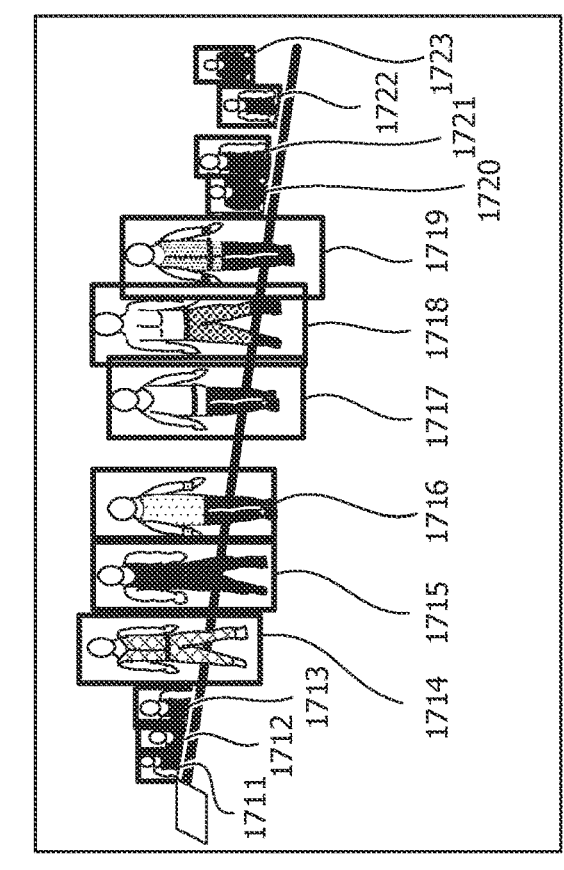

FIG. 2 is a flowchart of a method of a comparative example 2;

FIG. 3 is a functional block diagram of an image processing apparatus;

FIG. 4 is a flowchart of an image process;

FIG. 5 is a block diagram of a multi-viewpoint image processing system;

FIG. 6 is a functional block diagram of an image processing apparatus in the multi-viewpoint image processing system;

FIGS. 7A to 7C are a diagram illustrating a target 3D space for the gymnastic performance;

FIG. 8 is a diagram illustrating a bounding box for the target gymnast;

FIGS. 9A and 9B are a diagram illustrating the target space, the target bounding box, and the non-target bounding boxes;

FIGS. 10A to 10E are a diagram illustrating the real 3D gymnast scales with various poses;

FIGS. 11A and 11B are a diagram illustrating about the scale range that is estimated from the statistical distribution of pre-obtained 3D gymnast poses;

Figures 12A, 12B:
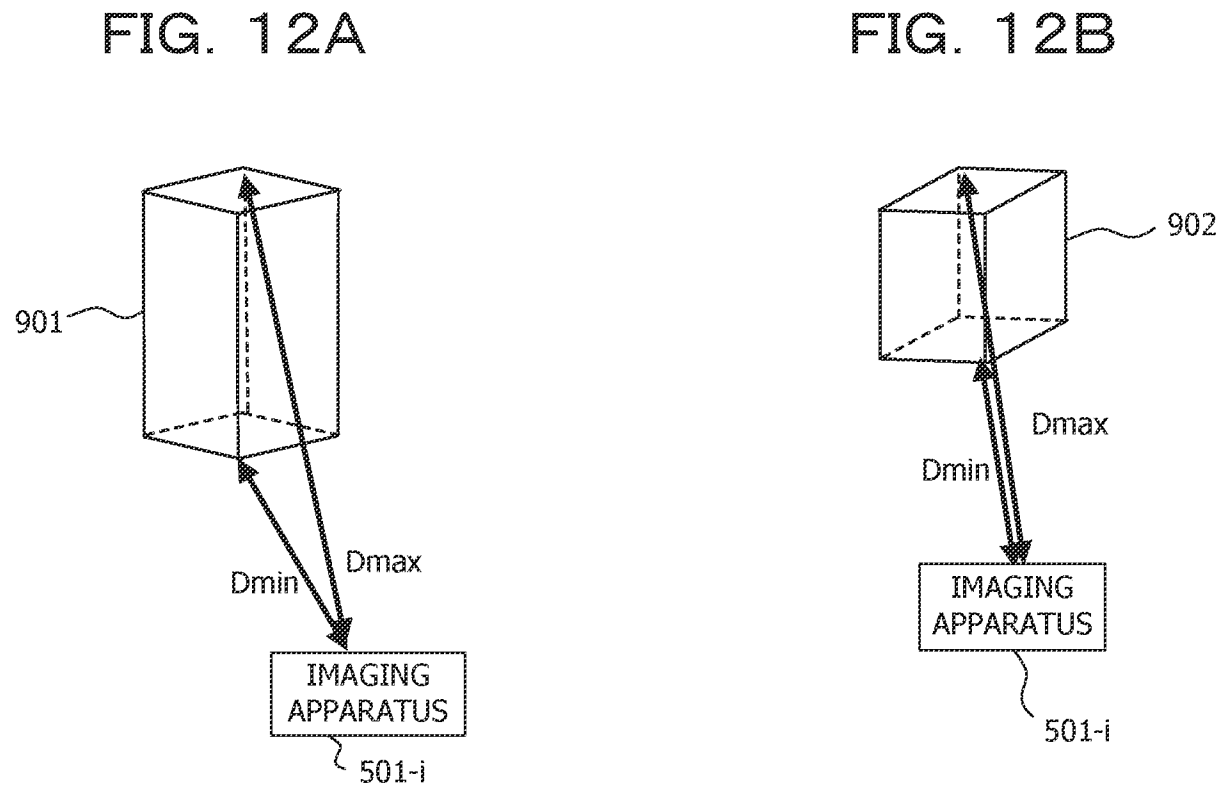

FIGS. 12A and 12B are a diagram illustrating D_max and D_min can be estimated by employing the camera parameters and the 3D coordinates of the target non-planar zone;

FIGS. 13A and 13B are a diagram illustrating most of non-target bounding boxes that are out of the target 3D space are filtered out;

FIGS. 14A to 14D are a diagram illustrating most of non-target bounding boxes that are out of the target 3D space are filtered out;

FIGS. 15A to 15D are a diagram illustrating most of non-target bounding boxes that are out of the target 3D space are filtered out;

FIG. 16 is a flowchart of an image process in the multiviewpoint image processing system;

FIGS. 17A and 17B are a diagram illustrating the proposed method can be applied in other tasks to exclude persons that are out of the target 3D space.

Figure 18B:
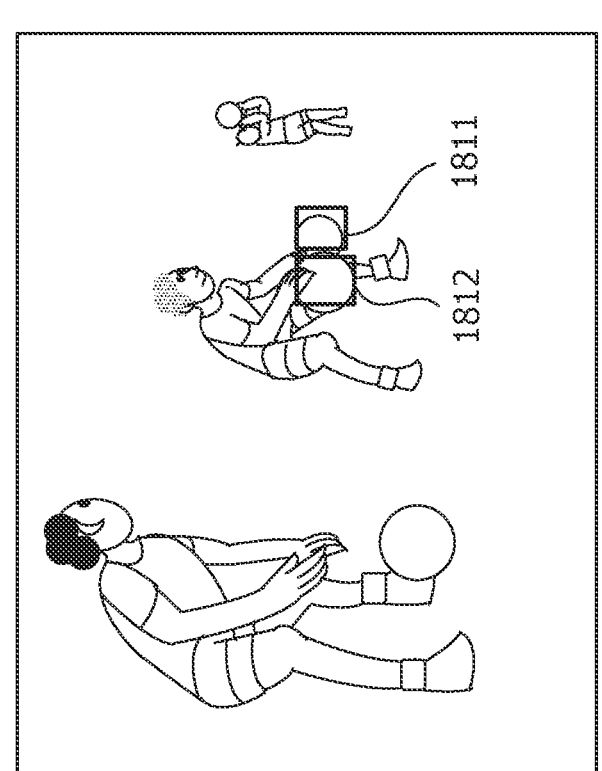
Figure 18A:
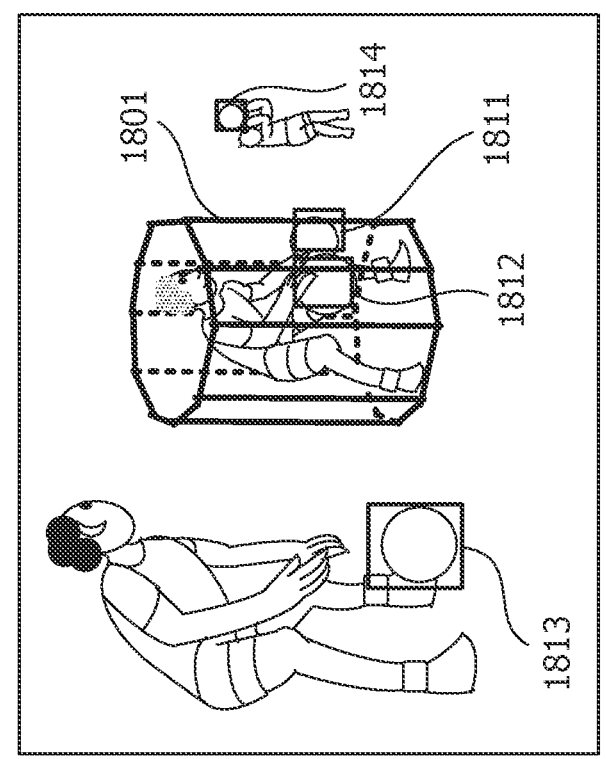

FIGS. 18A and 18B are a diagram illustrating the proposed method can be applied in other tasks to exclude objects (e.g., basketball) that are out of the target 3D space.

Figure 19:
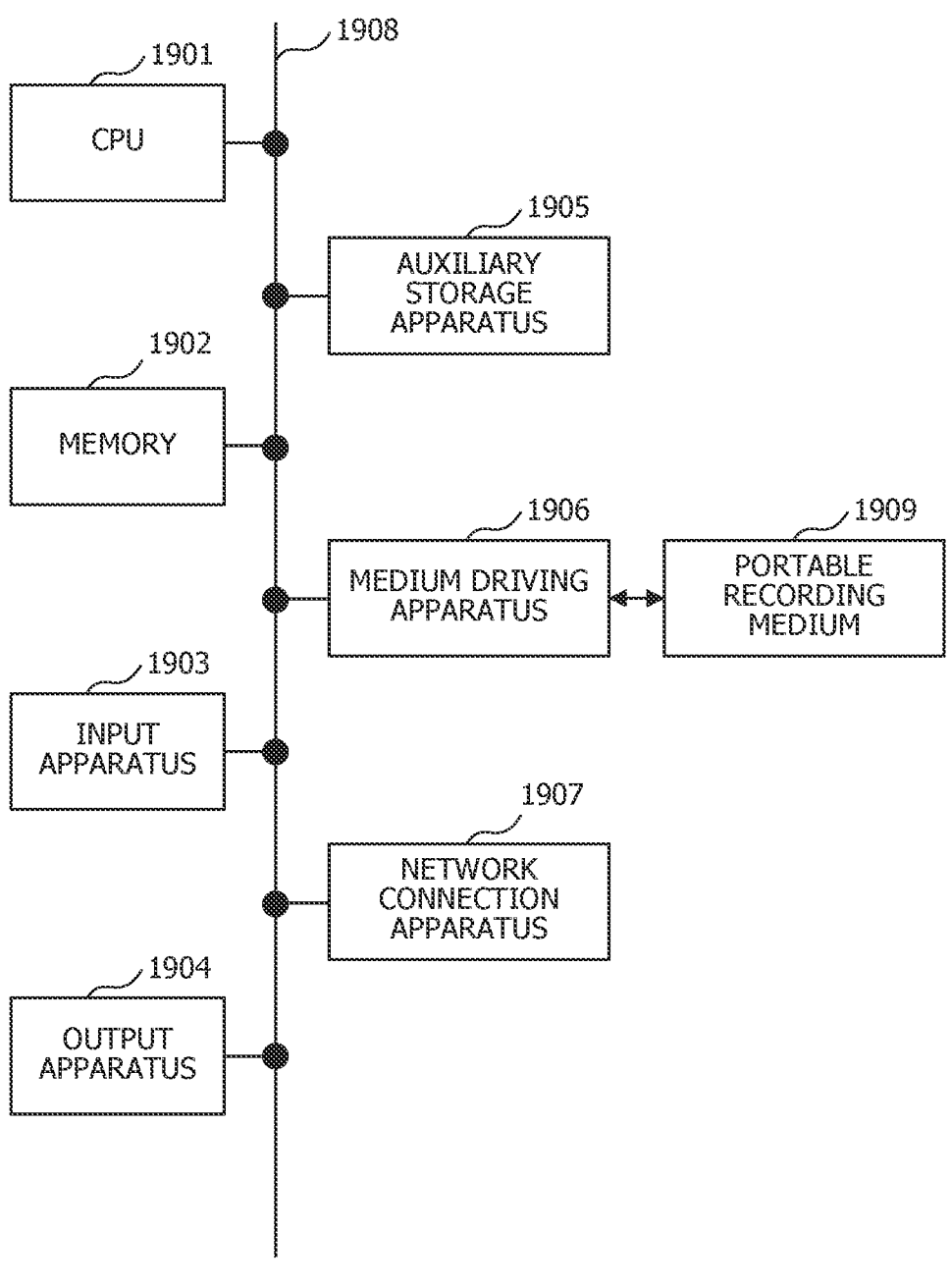

FIG. 19 is a hardware configuration diagram of an information processing apparatus.

DESCRIPTION OF EMBODIMENTS

When a bounding box is set as a region for performing a skeleton recognition of a human body, a gymnastic grading support system constituted by the skeleton recognition and a technique recognition has been attracting attention as an application field thereof. As a technique related to a sport, an adaptive appearance model for tracking a three dimensional robust object, a camera pose estimation technique for a sport stadium, and a technique for specifying a position of the sport stadium from an image are also known. Further, a technique for specifying a position of a person using a panoramic video is also known.

On the other hand, as another application example of the bounding box, an image monitoring apparatus that detects a target object from a monitoring image obtained by capturing a monitoring space is also known. There is also known a target object recognition system that can stably obtain a highly-accurate background in any situation and does not fail in detection even when influenced by illumination variation, shielding, or the like. A system for object specification and behavior characterization using video analysis is also known.

When a player who performs a performance in a sport stadium is captured by a camera and the performance of the player is scored using the captured image, a method of specifying a region in which the player to be scored appears in the image and then recognizing a skeleton of the player is effective in analyzing a motion of a person with high accuracy as in scoring. However, when a plurality of persons including the player to be scored are captured in the image, it is difficult to specify the region in which the player to be scored is captured.

Note that such a problem occurs not only when scoring the performance of the player using the image but also when specifying a region related to various target objects appearing in the image.

In one aspect, the present disclosure is directed to specify a region related to a target object which moves in an image in which a plurality of objects are captured. A movement referred to here includes not only a general standing posture but also an acrobatic posture such as a tumble in gymnastics.

Hereinafter, embodiments will be described in detail with reference to the drawings.

When the skeleton of a player is recognized using an image captured in a sport stadium and a performance is scored from the result, it is effective to specify a player who is performing a performance in a target space from among a large number of persons appearing in the image. The target space is a predetermined space in which the player to be scored performs the performance in a three dimensional space.

In this case, a person appearing in a background is excluded from the large number of persons appearing in the image, and the player performing the performance in the target space is specified. The person appearing in the background includes another player, a coach, a spectator, a referee, a cameraman, and the like who is not performing the performance in the target space. Hereinafter, the player who is performing the performance in the target space may be referred to as the player in the target space.

When identifying the player in the target space using an information processing apparatus (computer), the information processing apparatus extracts a bounding box surrounding each person from the image. Then, the information processing apparatus excludes the bounding box of the person appearing in the background or a foreground from extracted bounding boxes, thereby extracting the bounding box of the player in the target space. This may improve an accuracy of subsequent skeleton recognition.

As a method of excluding the bounding box of the person appearing in the background, for example, the methods of the comparative example 1 and the comparative example 2 are exemplified.

Figure 1:
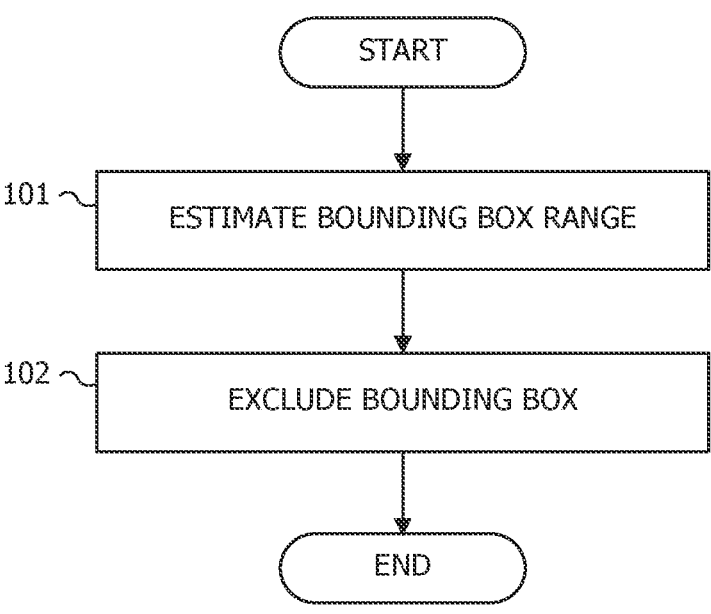
FIG. 1 is a flowchart of a method of a comparative example 1.

FIG. 1 is a flowchart illustrating a method of the comparative example 1. First, the user selects a plurality of bounding boxes within a target region from among a large number of bounding boxes extracted from the image, and estimates a bounding box range from sizes of the selected bounding boxes (step 101). The target region represents a region in the image corresponding to the target space, and the bounding box range represents a range of the size of the bounding box surrounding the player in the target space.

Next, the information processing apparatus excludes a bounding box having a size not belonging to the estimated bounding box range from the bounding boxes extracted from the image (step 102).

However, the closer the camera is to the target space in the three dimensional space, the larger the bounding box of the target region in the image and the player in the target space, and the further the camera is from the target space, the smaller the bounding box of the target region and the player in the target space. Therefore, in the method of the comparative example 1, every time a distance between the camera and the target space is changed, a selection of the bounding box and an estimation of the bounding box range are repeated by a manual operation. Therefore, the method of the comparative example 1 is not efficient and is not suitable for an on-line process.

FIG. 2 is a flowchart illustrating a method of the comparative example 2. The method of the comparative example 2 is based on a premise that a person moves on a ground and the ground is a flat surface, as described in Non-Patent Documents 2 to 4.

First, the information processing apparatus estimates positions of feet of each person by back-projecting midpoints of bases of each bounding box extracted from the image onto the three dimensional space (step 201). Next, the information processing apparatus excludes a bounding box in which the estimated position of the foot is not present on the ground of the sport stadium, from the bounding boxes extracted from the image (step 202).

According to the method of the comparative example 2, in a game such as a soccer or a basketball, the bounding box of the spectator or the like in the background may be excluded. However, in a game such as gymnastics in which a player performs in a space away from a floor surface of the sport stadium, the premise that the person moves on the ground is not satisfied. When the method of the comparative example 2 is applied to the image of a gymnast, the position of the foot of the gymnast in the target space does not exist on the floor surface, and thus the bounding box of the gymnast is erroneously excluded.

FIG. 3 illustrates an example of a functional configuration of the image processing apparatus according to the embodiment. An image processing apparatus 301 of FIG. 3 includes an object extraction unit 311, a determination unit 312, and a target object extraction unit 313.

FIG. 4 is a flowchart illustrating an example of the image process performed by the image processing apparatus 301 in FIG. 3. First, the object extraction unit 311 extracts a region (bounding box) related to each of a plurality of objects from an image captured by the imaging apparatus (step 401).

Next, the determination unit 312 determines a threshold value based on the range of the space in which the target object moves and the position of the imaging apparatus (step 402). Then, the target object extraction unit 313 extracts a region (bounding box) related to the target object from the regions related to the plurality of objects based on a comparison result obtained by comparing a size of the region related to each of the plurality of objects with the threshold value (step 403).

The image processing apparatus 301 of FIG. 3 may identify the region related to the target object which moves in the image including the plurality of objects.

FIG. 5 illustrates an example of the configuration of the multi-viewpoint image processing system including the image processing apparatus 301 illustrated in FIG. 3. The multi-viewpoint image processing system of FIG. 5 includes imaging apparatuses 501-1 to 501-N(N is an integer of 2 or more indicating a number of imaging apparatuses), a synchronization signal generator 502, a capture apparatus 503, and an image processing apparatus 504.

The multi-viewpoint image processing system performs a process for capturing a video of a gymnastic field and supporting a scoring of the performance of the gymnast in the target space. The imaging apparatuses 501-1 to 501-N are installed at predetermined places in the gymnastic field so as to surround the gymnast in the target space. A person appearing in the video corresponds to the object, and a gymnast in the target space corresponds to the target object. The object space corresponds to the range of the space in which the target object moves.

The imaging apparatuses 501-1 to 501-N, the synchronization signal generator 502, the capture apparatus 503, and the image processing apparatus 504 are a hardware. The image processing apparatus 504 corresponds to the image processing apparatus 301 in FIG. 3.

The synchronization signal generator 502 outputs a synchronization signal to the imaging apparatuses 501-1 to 501-N via a signal cable.

The imaging apparatus 501-*i* (i=1 to N) is, for example, a camera having an imaging element such as a Charge-Coupled Device (CCD) or a Complementary Metal-Oxide-Semiconductor (CMOS). Each imaging apparatus 501-*i* captures a video of the target space in the gymnastic field in synchronization with the synchronization signal output from the synchronization signal generator 502, and outputs the video to the capture apparatus 503 via the signal cable.

The capture apparatus 503 aggregates a digital signal of the video output from each of the imaging apparatuses 501-1 to 501-N and outputs a aggregated result to the image processing apparatus 504. The video output from the capture apparatus 503 includes an image at each of a plurality of synchronized times.

FIG. 6 illustrates an example of the functional configuration of the image processing apparatus 504 illustrated in FIG. 5. The image processing apparatus 504 of FIG. 6 includes an acquisition unit 611, an object extraction unit 612, a determination unit 613, a target object extraction unit 614, a skeleton recognition unit 615, an output unit 616, and a storage unit 617. The object extraction unit 612, the determination unit 613, and the target object extraction unit 614 correspond to the object extraction unit 311, the determination unit 312, and the target object extraction unit 313 of FIG. 3, respectively.

The storage unit 617 stores target space information 622 and imaging apparatus information 623. The target space information 622 is information indicating the target space. In the case of gymnastics, the target space is set in advance in accordance with a type of a event to be scored (there are 10 male and female events such as a horse, a hanging ring, and a balance beam). As a shape of the target space, a rectangular parallelepiped, a combination of a plurality of rectangular parallelepipeds, a prism, a cylinder, or the like may be used. For example, when the shape of the target space is represented by a solid having m vertices, the target space information 622 may include three dimensional coordinates (xj, yj, zj) (j=1 to m) of the m vertices.

FIGS. 7A to 7C illustrate an example of the target space. FIG. 7A illustrates an example of the target space of the rectangular parallelepiped. When the shape of the target space is the rectangular parallelepiped 701, the target space information 622 includes three dimensional coordinates (xj, yj, zj) (j=1 to 8) of eight vertices of the rectangular parallelepiped 701.

FIG. 7B illustrates an example of the target space for the gymnast's performance. Based on the gymnastic category, the target space could be approximated by multiple parallelepipeds. The shape of the target space in FIG. 7B is a shape obtained by combining the rectangular parallelepiped 701 and the rectangular parallelepiped 702. In this case, the target space information 622 includes three dimensional coordinates (xj, yj, zj) (j=1 to 8) of eight vertices of the rectangular parallelepiped 701 and three dimensional coordinates (xj, yj, zj) (j=9 to 16) of eight vertices of the rectangular parallelepiped 702.

FIG. 7C illustrates an example of the target space of a hexagonal prism. When the shape of the target space is the hexagonal prism 703, the target space information 622 includes three dimensional coordinates (xj, yj, zj) (j=1 to 12) of twelve vertices of the hexagonal prism 703.

The imaging apparatus information 623 includes positional coordinates (Xi, Yi, Zi) (i=1 to N), a focal length f, and an effective scale s (three dimensional distance per pixel) of each imaging apparatus 501-*i* in the three dimensional space. In this example, for the sake of simplicity, it is assumed that the focal lengths f of the imaging apparatus 501-1 to the imaging apparatus 501-N are the same and an aspect ratio is 1.

The acquisition unit 611 acquires a video output from the capture device 503, extracts an image 621 at each time from the acquired video, and stores the image in the storage unit 617.

The object extraction unit 612 performs a person detection process to extract, from the image 621, a bounding box of each of a plurality of persons appearing in the image 621, generates region information 626 indicating the bounding box of each person, and stores the region information 626 in the storage unit 617. The bounding box of the person corresponds to a region related to the object. The region information 626 includes, for example, a coordinates (xp, yp) of an upper left vertex of the bounding box in the image 621, a width wp of the bounding box, and a height hp of the bounding box.

FIG. 8 illustrates an example of the bounding box extracted from the image 621. A bounding box 801 encloses a gymnast performing a performance of a balance base. In this case, coordinates of a lower right vertex 812 of the bounding box 801 are represented by (xp+wp, yp+hp), using the coordinates (xp, yp) of an upper left vertex 811 of the bounding box 801, a width wp of the bounding box 801, and a height hp of the bounding box 801.

FIGS. 9A and 9B illustrate an example of the target space the bounding box in the image 621. FIG. 9A illustrates an example of the target space and the bounding box in a performance of the hanging ring. A target space 901 is a space in which the gymnast performs the performance of the hanging ring in the three dimensional space. A bounding box 911 is a bounding box of the gymnast in the target space 901, and a bounding box 912 is a bounding box of a person in the background.

FIG. 9B illustrates an example of the target space and the bounding box in the performance of the balance beam. A target space 902 is a space in which the gymnast performs the performance of the balance beam in the three dimensional space. A bounding box 913 is a bounding box of the gymnast in the target space 902, and a bounding box 914 is a bounding box of the person in the background.

The determination unit 613 estimates a size of the gymnast in the target space, generates target object information 624 indicating the estimated size of the gymnast, and stores the target object information 624 in the storage unit 617. The size of the gymnast is represented by, for example, a solid that surrounds the body of the gymnast without a gap in the three dimensional space. As the solid representing the size of the gymnast, a rectangular parallelepiped, a combination of a plurality of rectangular parallelepipeds, a prism, a cylinder, or the like may be used. Since a posture of the gymnast performing the performance changes with the movement of the gymnast, the shape of the solid representing the gymnast also changes with the movement of the gymnast.

FIGS. 10A to 10E illustrate an example of the solid representing the gymnast. In this example, a rectangular parallelepiped is used as the solid representing the gymnast. FIGS. 10A to 10E illustrate examples of rectangular parallelepipeds corresponding to various postures of gymnasts. The height H represents a vertical length of the rectangular parallelepiped, a width W_max represents a maximum value of a horizontal length of the rectangular parallelepiped as viewed from a plurality of cameras, and a width W_min represents a minimum value of the horizontal length of the rectangular parallelepiped as viewed from the plurality of cameras.

As described above, since the shape of the solid representing the gymnast changes in various ways according to the posture of the gymnast, the determination unit 613 estimates the size of the gymnast based on statistical information regarding an occurrence frequency of each of the plurality of shapes of the body of the gymnast.

The statistical information on the occurrence frequency of the shape of the body may be acquired from, for example, motion capture, the skeleton recognition by a three dimensional sensing (Non-Patent Document 1), an open data set, or the like. As the target object information 624, for example, a combination of a threshold value T1 indicating a lower limit of S_min and a threshold value T2 indicating an upper limit of S_max may be used. S_min represents a sum of W_min and H, and S_max represents a sum of W_max and H.

FIGS. 11A and 11B illustrates an example of the statistical information on the occurrence frequency of the shape of the body. FIG. 11A illustrates an example of a distribution of S_min of a rectangular parallelepiped representing each of M postures. The horizontal axis represents a value (mm) of S_min, and the vertical axis represents a number of postures represented by the rectangular parallelepiped corresponding to the value of S_min.

The determination unit 613 calculates T1 such that the number of postures having S_min equal to or smaller than T1 becomes M*(α/100) and the number of postures having S_min larger than T1 becomes M*((100−α)/100) in the distribution of FIG. 11A. As a result, a % of the postures having S_min close to the minimum value are excluded as outliers from the M postures. α is determined based on experimental results and the like. α may be a numerical value in a range of 0 to 20.

FIG. 11B illustrates an example of the distribution of S_max of the rectangular parallelepiped representing each of the M postures. The horizontal axis represents a value of S_max (mm), and the vertical axis represents the number of postures represented by the rectangular parallelepiped corresponding to the value of S_max.

The determination unit 613 calculates T2 such that the number of postures having S_max equal to or larger than T2 becomes M*(α/100) and the number of postures having S_max smaller than T2 becomes M*((100−α)/100) in the distribution of FIG. 11B. As a result, a % of the postures having S_max close to the maximum value are excluded as the outliers from the M postures.

By determining T1 and the T2 using the statistical information regarding the occurrence frequency of the shape of the body, even when the posture of the gymnast changes in various ways, it is possible to generate the target object information 624 which is appropriate and reflects the change in posture.

Next, the determination unit 613 determines a threshold value indicating the range of the size of the bounding box TB surrounding the gymnast in the target space using the target space information 622, the imaging apparatus information 623, and the target object information 624. The bounding box TB corresponds to the region related to the target object.

The determining unit 613 determines, for example, a threshold value B1 indicating a lower limit of the size of the bounding box TB and a threshold value B2 indicating an upper limit of the size of the bounding box TB in the image 621, and stores a combination of B1 and B2 in the storage unit 617 as the range information 625. B1 is an example of a first threshold value, and B2 is an example of a second threshold value.

The determination unit 613 may calculate B1 and B2 for each pixel by the following equations based on perspective transformation, for example.

$$B1 = (f/s) * (T1/\text{D\_max}) \tag{1}$$

$$B2 = (f/s) * (T2/\text{D\_min}) \tag{2}$$

f represents a focal length included in the imaging apparatus information 623, and s represents a three dimensional distance per pixel included in the imaging apparatus information 623. Thus, f/s corresponds to the focal length in pixel unit. T1 and T2 represent the threshold values included in the target object information 624.

D_max represents a maximum value of the three dimensional distance D (i, j) from the imaging apparatus 501-i to the j-th (j=1 to m) vertex of the target space, and D_min represents a minimum value of D (i, j). The determination unit 613 may calculate D (i, j) using the positional coordinates (Xi, Yi, Zi) of the imaging apparatus 501-i included in the imaging apparatus information 623 and the three dimensional coordinates (xj, yj, zj) of the j-th vertex included in the target space information 622.

FIGS. 12A and 12B illustrates an example of D_max and D_min. FIG. 12A illustrates an example of D_max and D_min for the target space 901 of FIG. 9A. In this case, a maximum value of the three dimensional distances D (i, j) (j=1 to 8) from the imaging apparatus 501-i to the eight vertices of the target space 901 is used as D_max, and a minimum value is used as D_min.

FIG. 12B illustrates an example of D_max and D_min for the target space 902 of FIG. 9B. In this case, a maximum value of the three dimensional distances D (i, j) (j=1 to 8) from the imaging apparatus 501-i to the eight vertices of the target space 902 is used as D_max, and a minimum value is used as D_min.

By determining B1 and B2 using the target space information 622, the imaging apparatus information 623, and the target object information 624, it is possible to generate the range information 625 which is appropriate according to the three dimensional distance from the imaging apparatus 501-i to the target space and the size of the gymnast.

The object extraction unit 614 calculates the size BS of each bounding box by the following equation using the width wp and the height hp included in the region information 626.

$$BS = wp + hp \tag{3}$$

Next, the target object extraction unit 614 compares BS of the respective bounding boxes with B1 and B2, respectively, included in the range information 625. Then, the target object extraction unit 614 extracts one or more bounding boxes having BS larger than B1 and smaller than B2 as bounding boxes TB from among the plurality of bounding boxes indicated by the region information 626. The target object extraction unit 614 stores the region information 626 of the extracted bounding box TB in the storage unit 617 as target object region information 627.

As an example, a case where the following four bounding boxes are extracted from the image 621 will be described.

$$BOX1 \ wp = 53 \ hp = 97$$

$$BOX2 \ wp = 46 \ hp = 128$$

$$BOX3 \ wp = 475 \ hp = 598$$

$$BOX4 \ wp = 102 \ hp = 421$$

In this case, according to equation (3), the BS of each bounding box is calculated as follows:

$$BOX1 \ BS = 150$$

$$BOX2 \ BS = 174$$

$$BOX3 \ BS = 1073$$

$$BOX4 \ BS = 523$$

When B1=245 and B2=847 are established, BSs of BOX1 and BOX2 are smaller than B1, and BS of BOX3 is larger than B2. BS of BOX4 is larger than B1 and smaller than B2. Therefore, BOX1 to BOX3 are excluded, and only BOX4 is extracted as the bounding box TB.

By extracting a bounding box having BS that is larger than B1 and smaller than B2 as the bounding box TB, it is possible to exclude background and foreground persons from a large number of persons appearing in the image and to specify the gymnast in the target space.

FIGS. 13A and 13B illustrate an example of the target object extraction process for extracting the bounding box TB. FIG. 13A illustrates an example of a plurality of bounding boxes extracted from the image 621 obtained by capturing a performance of a hanging ring. A bounding box 1311 is a bounding box of the gymnast in a target space 1301, and a bounding box 1312 is a bounding box of an assistant who assists an action of hanging from the hanging ring by the gymnast. The other 14 small bounding boxes are a bounding box of the person in the background.

FIG. 13B illustrates an example of the bounding box TB extracted by the target object extraction process for the 16 bounding boxes in FIG. 13A. In this example, the 14 bounding boxes in the background are excluded, and the bounding box 1311 and the bounding box 1312 are extracted as the bounding box TB. Among these, the bounding box 1312 of the assistant is not extracted from the image 621 after a start of the performance, and thus may be excluded from the target of a subsequent process by performing a person tracking process.

FIGS. 14A to 14D illustrate an example of a plurality of bounding boxes extracted from four images 621 captured by four imaging apparatuses 501-*i* (i=1 to 4) at the same time in the performance of the hanging ring.

Figure 14A:
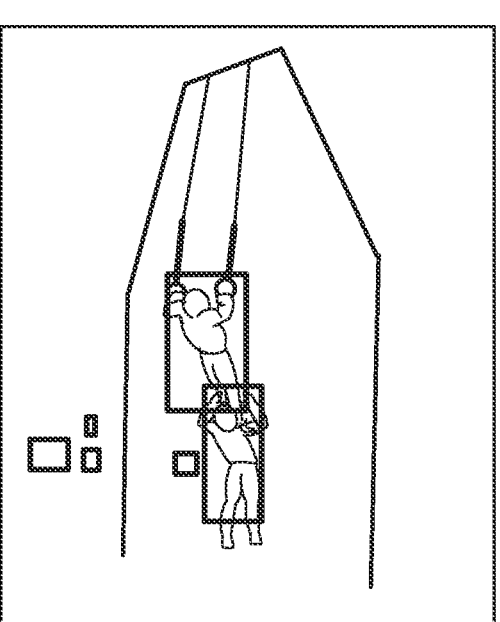
Figure 14B:
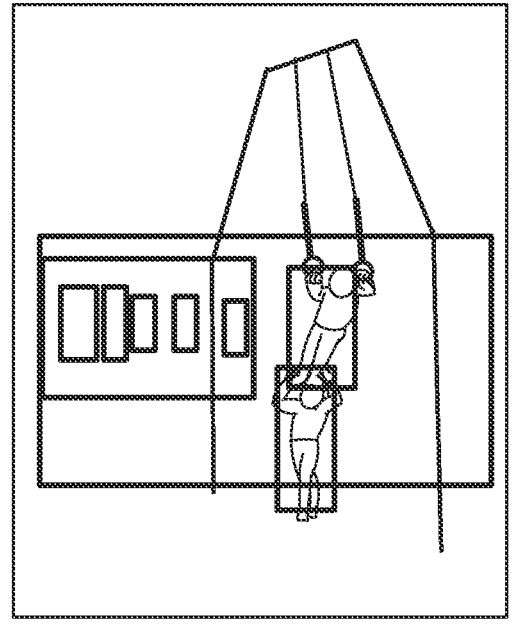
Figure 14C:
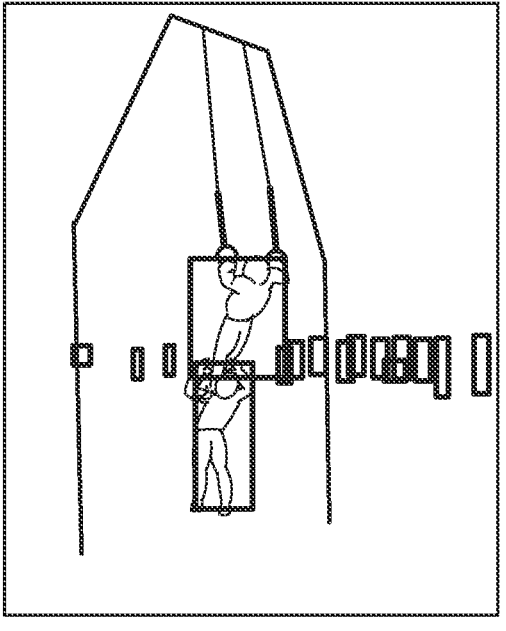
Figure 14D:
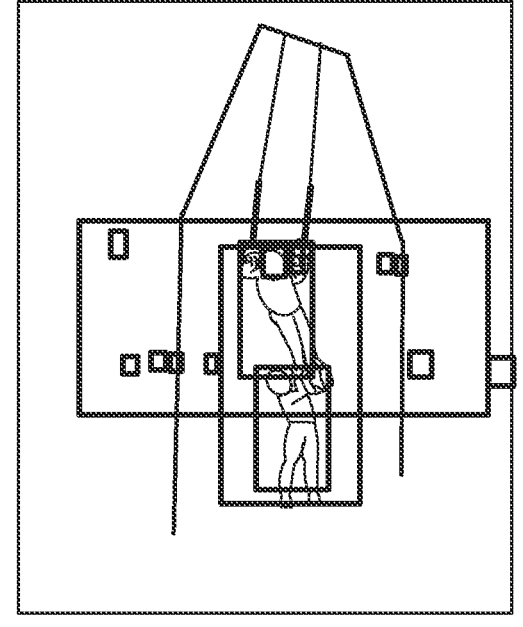

FIG. 14A illustrates an example of a plurality of bounding boxes extracted from the image 621 captured by the image capturing apparatus 501-1. FIG. 14B illustrates an example of a plurality of bounding boxes extracted from the image 621 captured by the imaging apparatus 501-2. FIG. 14C illustrates an example of a plurality of bounding boxes extracted from the image 621 captured by the imaging apparatus 501-3. FIG. 14D illustrates an example of a plurality of bounding boxes extracted from the image 621 captured by the imaging apparatus 501-4.

The bounding boxes of FIGS. 14B and 14D include not only the bounding boxes of each person, but also large bounding boxes containing multiple persons.

FIGS. 15A to 15D illustrates an example of a bounding box TB extracted by the target object extraction process for the bounding box of FIG. 14A.

Figure 15A:
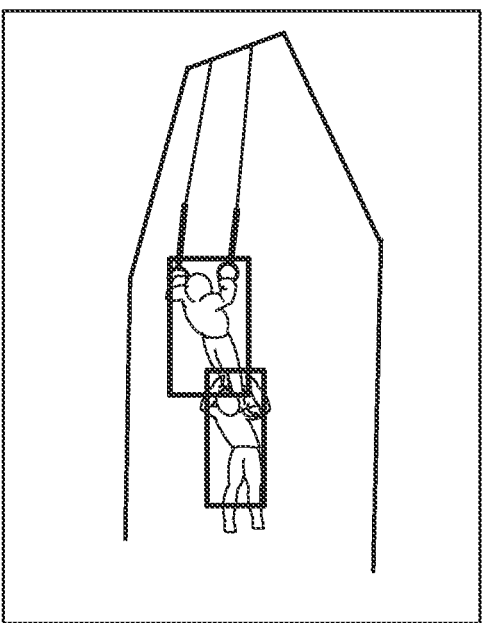
Figure 15B:
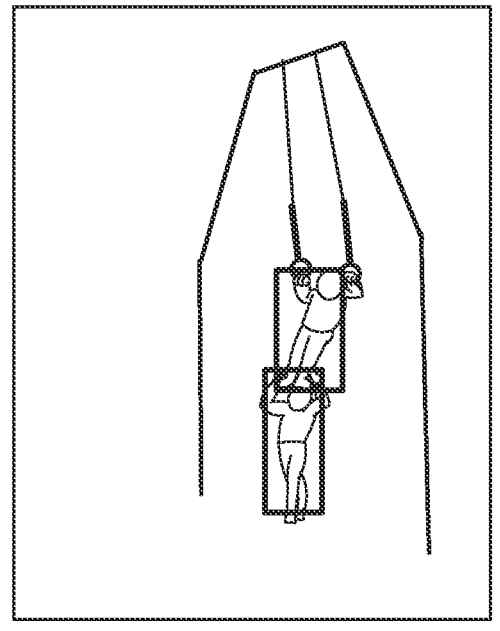
Figure 15C:
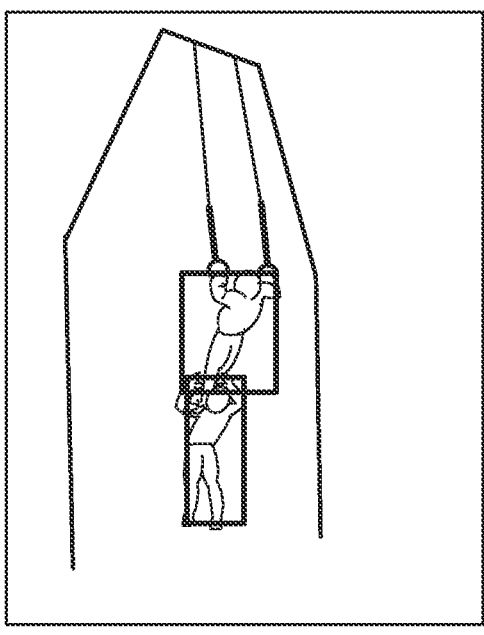
Figure 15D:
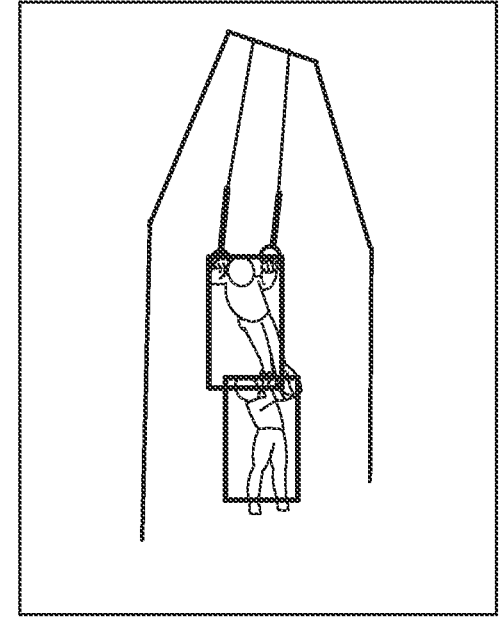

FIG. 15A illustrates an example of the bounding box TB extracted by the target object extraction process for the bounding box of FIG. 14A. FIG. 15B illustrates an example of the bounding box TB extracted by the target object extraction process for the bounding box of FIG. 14B. FIG. 15C illustrates an example of the bounding box TB extracted by the target object extraction process for the bounding box of FIG. 14C. FIG. 15D illustrates an example of the bounding box TB extracted by the target object extraction process for the bounding box of FIG. 14D.

In any of the images 621, the bounding box of the person in the background is excluded, and the bounding boxes of the gymnasts and the assistants in the target space are extracted as the bounding boxes TB.

When the type of the performance to be scored is changed, the target space information 622 and the target object information 624 are changed in accordance with the type of the performance. When an installation location of the imaging apparatus 501-*i* is changed, the imaging apparatus information 623 is changed in accordance with the installation location. When the target space information 622, the imaging apparatus information 623, or the target object information 624 is changed, the determination unit 613 updates the range information 625 by recalculating the threshold values B1 and B2. The target object extraction unit 614 extracts the bounding box TB using the updated range information 625.

The skeleton recognition unit 615 performs a skeleton recognition process using the image of the person included in the bounding box TB indicated by the target object region information 627 to recognize the skeleton of the gymnast in the target space and generates three dimensional coordinates of the recognized skeleton. The skeleton recognition process includes a person tracking process, a two dimensional posture estimation process, a three dimensional posture estimation process, and a smoothing process. As the skeleton recognition process, for example, a process described in Non-Patent Document 1 may be used.

The output unit 616 outputs three dimensional coordinates of the skeleton of the gymnast. By recognizing the technique of the performance from a time-series change of the three dimensional coordinates of the skeleton, it is possible to support the scoring of the performance performed by the gymnast.

According to the multi-viewpoint image processing system of FIG. 5, in an image in which a plurality of persons in the gymnastic field are captured, it is possible to specify the bounding box of the gymnast who is performing the performance in the target space.

Even when the distance between the imaging apparatus 501-*i* and the target space is changed, the threshold values B1 and B2 are automatically determined and the target object extraction process is automatically performed. Therefore, the bounding box of the gymnast in the target space may be efficiently specified. Therefore, the image process suitable for the on-line process is realized.

In addition, since the assumption that a person moves on the ground is not used, even when the position of the foot of the gymnast in the target space is not present on the floor surface, the boundary box of the gymnast is not excluded.

FIG. 16 is a flowchart illustrating an example of the image processing performed by the image processing apparatus 504 in FIG. 6. First, the acquisition unit 611 acquires a video output from the capture apparatus 503, and extracts the image 621 at each time from the acquired video (step 1601).

Next, the object extraction unit 612 performs the person detection process to extract the bounding box of each of the plurality of persons from the image 621, and generates the region information 626 indicating the bounding box of each of the plurality of persons (step 1602).

Next, the determination unit 613 estimates the size of the gymnast in the target space and generates the target object information 624 indicating the estimated size of the gymnast (step 1603). Next, the determination unit 613 determines threshold values B1 and B2 indicating the range of the size of the bounding box TB surrounding the gymnast in the target space using the target space information 622, the imaging apparatus information 623, and the target object information 624. Then, the determination unit 613 generates the range information 625 including B1 and B2 (step 1604).

Next, the target object extraction unit 614 compares the size BS of each bounding box with B1 and B2 included in the range information 625, and extracts a bounding box having a BS larger than B1 and smaller than B2 as a bounding box TB. Then, the object extraction unit 614 generates the target object region information 627 indicating the bounding box TB (step 1605).

Next, the skeleton recognition unit 615 performs the skeleton recognition process using the image of the person included in the bounding box TB to generate the three dimensional coordinates of the skeleton of the gymnast in the target space (step 1606). Then, the output unit 616 outputs the three dimensional coordinates of the skeleton of the gymnast (step 1607).

The multi-view image processing system of FIG. 5 is not limited to the process of specifying the bounding box of the gymnast appearing in the image of the gymnastic field, and may be applied to the process of specifying the bounding box of target objects appearing in various images.

The application field may be a support of scoring of performances in a figure skating, a detection of a posture of a performer in various events, or support of scoring in a basketball practice.

FIGS. 17A and 17B illustrate an example of the target object extraction process for extracting the boundary box of a performer from the image 621 obtained by capturing a stage of an event. A person appearing in the image 621 corresponds to an object, and the performer who performs on the stage corresponds to a target object. In this example, the posture of the performer is detected using the image included in the extracted boundary box of the performer, and a three dimensional avatar of the performer is displayed on a screen on the stage.

FIG. 17A illustrates an example of bounding boxes of each of the plurality of persons extracted from the image 621 obtained by capturing the stage. Bounding boxes 1714 to 1719 are bounding boxes of performers who perform performances on the stage. Bounding boxes 1711 to 1713 and the bounding boxes 1720 to 1723 are bounding boxes of spectators in the background.

FIG. 17B illustrates an example of the boundary boxes of the performers extracted by the target object extraction processing for the 13 boundary boxes in FIG. 17A. In this example, the seven bounding boxes in the background are excluded, and the bounding boxes 1714 to 1719 are extracted as the bounding boxes of the performers.

FIGS. 18A and 18B illustrate an example of the target object extraction process for extracting a bounding box of a basketball that a player is dribbling from the image 621 obtained by capturing a basketball practice scene. The basketball captured in the image 621 corresponds to the object, and the basketball dribbled by the player corresponds to the target object. In this example, the image contained in the bounding box of the extracted basketball is used to support of scoring of a dribble.

FIG. 18A illustrates an example of the bounding box of each of a plurality of basketballs extracted from the image 621 obtained by capturing the basketball practice scene. A bounding box 1811 and a bounding box 1812 are bounding boxes of a target basketball that the players in a target space 1801 are dribbling. A bounding box 1813 and a bounding box 1814 are bounding boxes of basketballs held by other players.

In this example, a space of a decagonal priS_mincluding a player dribbling the target basketball is used as the target space 1801. Therefore, the three dimensional coordinates of each vertex of the target space 1801 are dynamically updated in accordance with the movement of the player. A position of the player dribbling the target basketball may be estimated by the method described in Non-Patent Document 5, for example. The size of the target basketball is known.

FIG. 18B illustrates an example of the bounding box of the target basketball extracted by the target object extraction process for the four bounding boxes in FIG. 18A. In this example, the bounding box 1813 and the bounding box 1814 are excluded, and the bounding box 1811 and the bounding box 1812 are extracted as the bounding boxes of the target basketball.

The configuration of the image processing apparatus 301 in FIG. 3 is merely an example, and some of the components may be omitted or changed according to a use or a condition of the image processing apparatus 301.

The configuration of the multi-viewpoint image processing system of FIG. 5 is merely an example, and some of the constituent elements may be omitted or changed according to the use or the condition of the multi-viewpoint image processing system. The configuration of the image processing apparatus 504 in FIG. 6 is merely an example, and some of the constituent elements may be omitted or changed according to the use or the condition of the multi-view image processing system.

For example, in the image processing apparatus 504 of FIG. 6, the acquisition unit 611 may be omitted in a case where the image 621 is stored in the storage unit 617 in advance. When the skeleton recognition process is not necessary, the skeleton recognition unit 615 may be omitted.

The flowcharts of FIGS. 1, 2, 4, and 16 are merely examples, and some of the processes may be omitted or changed according to the configuration or conditions of the information processing apparatus or the image processing apparatus. For example, in the image process of FIG. 16, when the image 621 is stored in the storage unit 617 in advance, the process of step 1601 may be omitted. When the skeleton recognition process is not necessary, the process of step 1606 may be omitted.

The target spaces illustrated in FIGS. 7, 9, 12, 13, and 18 are merely examples, and the image processing apparatus 504 may perform the image process using a target space having another shape. The bounding boxes illustrated in FIGS. 8, 9, 13 to 15, 17, and 18 are merely examples, and the position and size of the bounding box change according to the image 621. The image processing apparatus 504 may perform the image process using a region having another shape instead of the rectangular bounding box.

The solid illustrated in FIG. 10 is merely an example, and the solid representing the gymnast changes according to the type of the performance. The statistical information illustrated in FIG. 11 is merely an example, and the statistical information regarding the occurrence frequency of the shape of the body changes according to the type of the performance.

S_min is not necessarily the sum of W_min and H, and S_max is not necessarily the sum of W_max and H. The image processing apparatus 504 may calculate T1 and T2 using other indices as S_min and S_max.

Equations (1) to (3) are merely examples, and the image processing apparatus 504 may calculate B1, B2, and BS using other calculation equations.

FIG. 19 illustrates an example of the hardware configuration of an information processing apparatus used as the image processing apparatus 301 in FIG. 3 and the image processing apparatus 504 in FIG. 6. The information processing apparatus of FIG. 19 includes a Central Processing Unit (CPU) 1901, a memory 1902, an input apparatus 1903, an output apparatus 1904, an auxiliary storage apparatus 1905, a medium driving apparatus 1906, and a network connection apparatus 1907. These components are a hardware and are coupled to each other by a bus 1908. The capture device 503 of FIG. 5 may be coupled to the bus 1908.

The memory 1902 is, for example, a semiconductor memory such as a Read Only Memory (ROM), a Random Access Memory (RAM), or a flash memory, and stores a program and data used for a process. The memory 1902 may operate as the storage unit 617 of FIG. 6.

The CPU 1901 (processor) operates as the object extraction unit 311, the determination unit 312, and the target object extraction unit 313 of FIG. 3 by executing a program using the memory 1902, for example. The CPU 1901 also operates as the acquisition unit 611, the object extraction unit 612, the determination unit 613, the target object extraction unit 614, and the skeleton recognition unit 615 of FIG. 6 by executing the program using the memory 1902.

The input apparatus 1903 is, for example, a keyboard, a pointing device, or the like, and is used for inputting an instruction or information from a user or an operator. The output apparatus 1904 is, for example, a display apparatus, a printer, a speaker, or the like, and is used for outputting an inquiry or a result of a process to a user or an operator. The output apparatus 1904 may operate as the output unit 616 of FIG. 6.

The auxiliary storage apparatus 1905 is, for example, a magnetic disk device, an optical disk device, a magneto-optical disk device, a tape device, or the like. The auxiliary storage device 1905 also may be a hard disk drive or a Solid State Drive (SSD). The information processing apparatus may store the program and the data in the auxiliary storage apparatus 1905 and load them into the memory 1902 for use. The auxiliary storage apparatus 1905 may operate as the storage unit 617 of FIG. 6.

The medium driving apparatus 1906 drives a portable recording medium 1909 and accesses the recorded contents. The portable recording medium 1909 is a memory device, a flexible disk, an optical disk, a magneto-optical disk, or the like. The portable recording medium 1909 also may be a Compact Disk Read Only Memory (CD-ROM), a Digital Versatile Disk (DVD), a Universal Serial Bus (USB) memory, or the like. The user or the operator may store the program and the data in the portable recording medium 1909 and use them by loading them into the memory 1902.

As described above, the computer-readable recording medium that stores the program and the data used for the process is a physical (non-transitory) recording medium such as the memory 1902, the auxiliary storage device 1905, or the portable recording medium 1909.

The network connection apparatus 1907 is a communication interface circuit that is coupled to a communication network such as a Local Area Network (LAN) or a Wide Area Network (WAN) and performs a data conversion associated with communication. The information processing apparatus may receive the program and the data from an external apparatus via the network connection apparatus 1907, and may load the program and the data into the memory 1902 for use. The network connection apparatus 1907 may operate as the output unit 616 of FIG. 6.

Note that the information processing apparatus does not need to include all the components in FIG. 19, and some of the components may be omitted or changed according to the use or the condition. For example, if an interface with the user or the operator is not necessary, the input apparatus 1903 and the output apparatus 1904 may be omitted. When the information processing apparatus does not use the portable recording medium 1909 or the communication network, the medium driving apparatus 1906 or the network connection apparatus 1907 may be omitted.

Although the disclosed embodiments and advantages thereof have been described in detail, those skilled in the art will appreciate that various modifications, additions and omissions may be made therein without departing from the scope of the disclosure as expressly defined by the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an image processing program causing a computer to execute processes of:

extracting a bounding box of a region related to each of a plurality of objects from an image which is captured by an imaging apparatus;

determining a threshold value based on a range of a space in which a target object moves and a position of the imaging apparatus;

comparing a size of the region related to each of the plurality of objects with the threshold value; and extracting a bounding box of a region related to the target object from regions related to the plurality of objects based on a comparison result and performing skeleton recognition.

2. The non-transitory computer-readable recording medium according to claim 1, wherein a process of determining the threshold value includes determining the threshold value based on the range of the space in which the target object moves, the position of the imaging apparatus and a size of the target object.

3. The non-transitory computer-readable recording medium according to claim 2, wherein a shape of the target object changes in accordance with a movement of the target object, and the processes further include determining the size of the target object based on statistical information regarding a frequency of occurrence of each shape of the plurality of objects.

4. The non-transitory computer-readable recording medium according to claim 1, wherein the threshold value is a first threshold value indicating a lower limit of a size of the region related to the target object, the processes further include determining a second threshold value indicating an upper limit of the size of the region related to the target object based on the range of the space in which the target object moves and the position of the imaging apparatus, and a process of extracting the region related to the target object includes:

comparing a size of the region related to each of the plurality of objects with the first threshold value;

comparing the size of the region related to each of a plurality of objects with the second threshold value; and extracting, as the region related to the target object, a region having a size larger than the first threshold value and smaller than the second threshold value from among regions related to each of the plurality of objects.

5. The non-transitory computer-readable recording medium according to claim 1, wherein each of the plurality of objects is a person, and the target object is a person who performs a performance in the space in which the target object moves.

6. An image processing apparatus comprising:

a memory; and a processor coupled to the memory and configured to:

extract a bounding box of a region related to each of a plurality of objects from an image which is captured by an imaging apparatus;

determine a threshold value based on a range of a space in which a target object moves and a position of the imaging apparatus; and compare a size of the region related to each of the plurality of objects with the threshold value, extract a bounding box of a region related to the target object from regions related to the plurality of objects based on a comparison result, and perform skeleton recognition.

7. The image processing apparatus according to claim 6, wherein the processor determines the threshold value includes determining the threshold value based on the range of the space in which the target object moves, the position of the imaging apparatus and a size of the target object.

8. The image processing apparatus according to claim 7, wherein a shape of the target object changes in accordance with a movement of the target object, and the processor determines the size of the target object based on statistical information regarding a frequency of occurrence of each shape of the plurality of objects.

9. The image processing apparatus according to claim 6, wherein the threshold value is a first threshold value indicating a lower limit of a size of the region related to the target object, the processor:

determines a second threshold value indicating an upper limit of the size of the region related to the target object based on the range of the space in which the target object moves and the position of the imaging apparatus, compares a size of the region related to each of the plurality of objects with the first threshold value;

compares the size of the region related to each of a plurality of objects with the second threshold value; and extracts, as the region related to the target object, a region having a size larger than the first threshold value and smaller than the second threshold value from among regions related to each of the plurality of objects.

10. The image processing apparatus according to claim 6, wherein each of the plurality of objects is a person, and the target object is a person who performs a performance in the space in which the target object moves.

11. An image processing method which is executed a computer, the method comprising:

extracting a bounding box of a region related to each of a plurality of objects from an image which is captured by an imaging apparatus;

determining a threshold value based on a range of a space in which a target object moves and a position of the imaging apparatus;

comparing a size of the region related to each of the plurality of objects with the threshold value; and extracting a bounding box of a region related to the target object from regions related to the plurality of objects based on a comparison result and performing skeleton recognition.

12. The image processing method according to claim 11, wherein a process of determining the threshold value includes determining the threshold value based on the range of the space in which the target object moves, the position of the imaging apparatus and a size of the target object.

13. The image processing method according to claim 12, wherein a shape of the target object changes in accordance with a movement of the target object, and the method further includes determining the size of the target object based on statistical information regarding a frequency of occurrence of each shape of the plurality of objects.

14. The image processing method according to claim 11, wherein the threshold value is a first threshold value indicating a lower limit of a size of the region related to the target object, the method further includes determining a second threshold value indicating an upper limit of the size of the region related to the target object based on the range of the space in which the target object moves and the position of the imaging apparatus, and

a process of extracting the region related to the target object includes:

comparing a size of the region related to each of the plurality of objects with the first threshold value;

comparing the size of the region related to each of a plurality of objects with the second threshold value; and extracting, as the region related to the target object, a region having a size larger than the first threshold value and smaller than the second threshold value from among regions related to each of the plurality of objects.

15. The image processing method according to claim 11, wherein each of the plurality of objects is a person, and the target object is a person who performs a performance in the space in which the target object moves.

\* \* \* \* \*